(12) United States Patent
Cameron (10) Patent No.: US 6,711,543 B2
(45) Date of Patent: Mar. 23, 2004

(54) LANGUAGE INDEPENDENT AND VOICE OPERATED INFORMATION MANAGEMENT SYSTEM

(75) Inventor: Seth A. Cameron, Salt Lake City, UT (US)

(73) Assignee: CameronSound, Inc., Salt Lake City, UT (US)

(*) Notice: Subject to any disclaimer, the term of this patent is extended or adjusted under 35 U.S.C. 154(b) by 0 days.

(21) Appl. No.: 10/161,550

(22) Filed: May 30, 2002

(65) Prior Publication Data

US 2003/0033152 A1 Feb. 13, 2003

Related U.S. Application Data (60) Provisional application No. 60/294,871, filed on May 30, 2001.

(51) Int. Cl.[7] .................. G10L 19/00; G10L 15/00; G10L 21/00
(52) U.S. Cl. .................. 704/270; 704/231; 704/278
(58) Field of Search .................. 715/503; 713/202; 709/203; 708/141; 707/503, 104.1; 704/9, 3, 275, 270.01, 270, 251, 234, 1; 701/213, 210; 455/563, 556; 379/88.22, 88.05, 88.03, 88.01

(56) References Cited

U.S. PATENT DOCUMENTS

| | | | | |
|---|---|---|---|---|
| 5,602,963 A | * | 2/1997 | Bissonnette et al. | 704/275 |
| 5,774,828 A | | 6/1998 | Brunts et al. | 701/210 |
| 5,794,205 A | * | 8/1998 | Walters et al. | 704/275 |
| 6,061,646 A | * | 5/2000 | Martino et al. | 704/3 |
| 6,157,935 A | * | 12/2000 | Tran et al. | 715/503 |
| 6,173,060 B1 | * | 1/2001 | Huang | 381/110 |
| 6,185,537 B1 | * | 2/2001 | Oh et al. | 704/275 |
| 6,272,457 B1 | * | 8/2001 | Ford et al. | 704/9 |
| 6,295,391 B1 | * | 9/2001 | Rudd et al. | 382/313 |

OTHER PUBLICATIONS

Rabiner et al., "Fundamental of Speech Recognition," 1993, Prentice–Hall, pp. 42–46, 129–132, 200–204.*
Johnson, et al., *Audio Indexing and retrieval of Complete Broadcast News Shows*, 2000, 15 pages.
Foote, *An Overview of Audio Information Retrieval*, Dec. 18, 1997, 18 pages.
Ng, et al., *Phonetic Recognition for Spoken Document Retrieva*, 1998, 4 pages.

* cited by examiner

*Primary Examiner*—Vijay Chawan
*Assistant Examiner*—V. Paul Harper
(74) *Attorney, Agent, or Firm*—Faegre & Benson LLP

(57) ABSTRACT

A voice operated portable information management system that is substantially language independent and capable of supporting a substantially unlimited vocabulary. The system includes a microphone, speaker, clock and GPS connected to a speech processing system. The speech processing system: 1) generates and stores compressed speech data corresponding to a user's speech received through the microphone, 2) compares the stored speech data, 3) re-synthesizes the stored speech data for output as speech through the speaker, 4) provides an audible user interface including a speech assistant for providing instructions in the user's language, 5) stores user-specific compressed speech data, including commands, received in response to prompts from the speech assistant for purposes of adapting the system to the user's speech, 6) identifies memo management commands spoken by the user, and stores and organizes compressed speech data as a function of the identified commands, and 7) identifies memo retrieval commands spoken by the user, and retrieves and outputs the stored speech data as a function of the commands. In addition to general purpose voice memo and retrieval functions, application supported by the information management system include time, data and stopwatch functions, temporal and geographic alarms and functions, calendar management, voice calculation, voice maps, mobile telephone tasks and audio content management.

23 Claims, 4 Drawing Sheets

Fig. 1

Fig. 2
Tree Data Structure for Voice Memo Organization

Fig. 3

Sample data structure for voice memos at each node or leaf of tree

Memo Data Structure –

Voice Data Phrase 1
Voice Data Phrase 2
...

- Time when created
- GPS where created
- Calendar Entry if any
- Alarm if any
- Time last visited

Fig. 4

LANGUAGE INDEPENDENT AND VOICE OPERATED INFORMATION MANAGEMENT SYSTEM

REFERENCE TO RELATED APPLICATION

This application claims the benefit of U.S. Provisional Application Ser. No. 60/294,871 filed on May 30, 2001 and entitled Language Independent Voice Operated Device and Associated Method, which is hereby incorporated by reference in its entirety.

FIELD OF THE INVENTION

The present invention relates generally to speech recognition systems. In particular, the invention is a substantially language independent, voice operated information management device and associated method.

BACKGROUND OF THE INVENTION

Speech storage and recognition technology has been implemented in a number of devices. Digital voice recorders capture, compress, and store speech, but they are not as useful for retrieving information, partly because the compression technologies used are not well-suited for known speech recognition pattern matching techniques. Users are typically limited to around 45 minutes of speech storage and must use buttons to navigate through sound files.

Speech dictation systems are designed to translate spoken language to text. This is a very challenging task that requires computer systems with large amounts of memory and processing power. Speech dictation systems have difficulty with words that are outside of their built-in vocabulary and difficulty achieving good performance across speaker variation. Also, these systems are language specific. Developing speech-to-text and text-to-speech systems for a specific language is difficult and expensive.

Voice command systems are designed to operate computer programs and databases with voice commands in place of a keyboard and mouse. These systems typically use speaker-independent, language dependent, speech technology. Limited vocabularies and simple grammar syntax give command and control systems a performance edge over open dictation systems.

Using voice to operate computer applications is usually less convenient than using a keyboard and mouse. However, voice command systems have had some success. For example, army mechanics have experimented with voice-enable portable computers that allow hands-free access to maintenance databases.

Voice dialing systems are voice command systems that use a combination of command recognition and user registered sound pattern matching. Such systems allow the user to store a voice pattern with a particular number, then use voice pattern matching to automatically re-dial the number.

Personal digital assistants (PDAs) are popular tools. They have moderate computational power and memory, making them less expensive and more portable than desktop personal computers (PCs), laptop PCs, or even handheld PCs. PDAs allow users to access information, store information, and perform tasks while away from more powerful but less portable devices.

There are several drawbacks with current PDAs. Entering information is tedious. With a pen-based PDA, entering simple things, such as a recipe, can take upwards of 5 minutes.

Entering information is a dedicated task. One cannot conveniently use today's PDAs while walking, driving, reporting on a live event, pulling items from a shelf, etc. Current PDA require the user's hands and eyes to operate.

PDAs are still larger than many people would like. A system that is not conveniently worn, like a wristwatch, will often be absent when needed most. Pen and keyboard-based PDAs are as small as they can get and still be usable.

In addition, it is impractical to integrate current speech recognition technologies with a PDA. First, PDA users expect data input to be reliable, but computer dictation systems make frequent mistakes. It is not known how to make effective speech dictation systems when: People speak with wildly different accents and pronunciations, People use out-of-vocabulary words, such as brand names company names, geographic names, etc. New words are constantly being created, so it is impossible for a speech dictation dictionary to be prepared. People insert filler words, misspeak, and create sentences unexpected by computational language models.

Second, using speech to text conversion programs requires the user to visually monitor the system's text output in order to make corrections and train new words during dictation. This is unacceptable in a portable, hands-free/eyes-free environment.

Third, while PDA users are worldwide, computer dictation systems are language specific. Creating a new dictation system for a language is expensive and time consuming. Many world languages have never had computer dictation systems developed for them. In addition, such dictation systems would not enable bi-lingual users to switch between or mix languages.

Fourth, consumers expect PDAs to be portable and relatively inexpensive, but dictation systems require tremendous computing power and memory. The computational power required to run speech dictation systems is beyond that found is most PDA. Increasing power increases cost and battery weight.

Fifth, consumers expect PDA data output to be reliable, but re-synthesizing speech from dictated text can introduce further errors. If users expect to retrieve data through PDA speech synthesis, it is better not to start from just text information because mispronunciations and incorrect prosody can make text-to-speech systems difficult to understand.

SUMMARY OF THE INVENTION

The present invention is a voice operated portable information management system that is substantially language independent and capable of supporting a substantially unlimited vocabulary. One embodiment of the invention includes an input transducer for receiving a user's speech and an output transducer for outputting sound including speech. A speech processing system is coupled to the input and output transducers and including means for: 1) generating and storing compressed speech data corresponding to a user's speech received through the input transducer; 2) comparing the stored speech data; 3) re-synthesizing the stored speech data for output as speech through the output transducer; 4) providing an audible user interface including a speech assistant for providing instructions in the user's language; 5) storing user-specific compressed speech data, including commands, received in response to prompts from the speech assistant for purposes of adapting the system to the user's speech; 6) identifying memo management commands spoken by the user, and storing and organizing compressed speech data as a function of the identified commands; and 7) identifying memo retrieval commands spoken by the user, and retrieving and outputting the stored speech data as a function of the commands.

Another embodiment of the invention includes one or more switches actuated by a user to indicate memo management commands and/or memo retrieval commands. The speech processing system is coupled to the one or more switches and operates as a function of the actuated switches.

Yet another embodiment of the invention includes a clock and a global positioning sensor (GPS) connected to the speech processing system. The speech processing system identifies temporal commands spoken by the user, stores and organizes compressed speech data and temporal actions, including alarms, as a function of the commands, and responds to the stored temporal actions. The speech processing system also identifies geographic commands spoken by a user, stores and organizes compressed speech data and geographic actions, including alarms, as a function of the commands, and responds to the stored geographic actions.

DETAILED DESCRIPTION OF THE PREFERRED EMBODIMENTS

Figure 1:
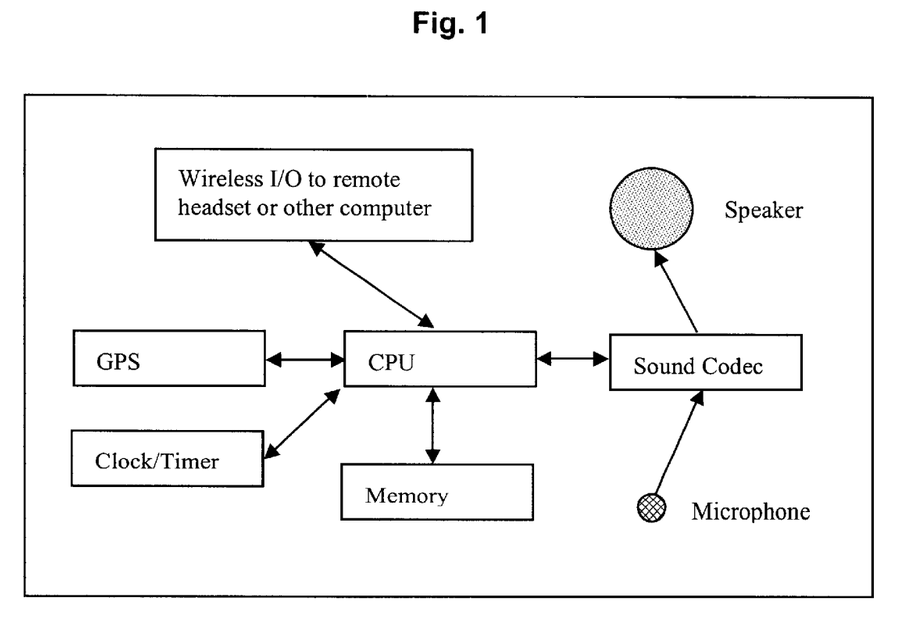
FIG. 1 is a block diagram illustration of the hardware components for one preferred embodiment of an information management system in accordance with the present invention.

FIG. 1 depicts the preferred architecture of a portable information management system in accordance with the present invention. The present invention is designed to be either a stand-alone portable electronic device or integrated into other electronics, such as a portable telephone or PDA.

The present invention has the ability to capture sound (via an attached or wireless microphone) and regenerate sound (via speaker or earphone). The microphone and speaker may be integrated as a single unit connected to the central processing unit, as might be the case in a wrist-worn implementation. Or, the microphone and speaker may be separate pieces that communicate over a wire or wireless link with the central processing unit.

The device has a memory unit for storing its programs and data. Because the prototypes of present invention can achieve compression rates of approximately 650 bits/sec, 5 minutes worth of data (~75 sentences) recorded every day for a year would fit into about 9 Mbytes of memory.

Some embodiments of the present invention have a wireless (or wired) input output port for communicating with external devices. In particular, it has the ability to upload and download programs and data. Programs and data uploaded or downloaded in this manner can, for example, be used for backup purposes or for further processing, such as downloading a dictated letter for transcription by a PC-base speech-to-text system, or downloading spreadsheet information. In yet other embodiments of the invention, this port may also be used to synchronize internal device settings to external events. One example could be synchronizing the device to a movie tape counter so that a film editor could take voice notes to help re-index back to particular scenes. Or, the device could be synchronized with a computer's directory system to link voice reminders with files.

Preferred (but not all) embodiments of the present invention include a clock and global positioning system (GPS) to expand the range of services it provides to the user. For example, we often can remember where and when we learned something (at college, sophomore year) but not remember the details of the knowledge. The clock and GPS systems put location and time stamps on each voice entry. This provides two powerful mechanisms to help the user retrieve stored information. Search queries can be based on time and place as well as content.

The present invention uses a voice agent or assistant to prompt, instruct, and/or reply to users in their preferred language. The assistant can welcome the user, aurally demonstrates how to use the present invention, and takes the user through a tutorial to create user-specific command templates for purposes of adapting the system to the user's voice.

Language dependent speech technology requires speech-to-text decoders to be developed for each language. This is an expensive and difficult task. In contrast, the present invention only requires the instructions and prompts to be translated and recorded in a new language. This can be done in a matter of days versus the months it takes to build a speech-to-text decoder for a new language. The present invention can be preloaded with voice assistants in popular languages, and the preferred one may be selected at time of purchase, or a voice assistant for a particular language may be transferred into the device via its external link.

Preferred embodiments of the present invention are configured to operate for a short adaptation period to adjust their encoding parameters (e.g., a codebook) to the user's voice. This process is fast and does not require reciting specific text. For example, if the present invention were built into a mobile telephone, it would adapt to voice data collected from about 5 minutes of the user's speech during everyday conversation. This codebook adaptation period offers several advantages such as greater speech compression and faster retrieval performance on smaller codebooks.

Other embodiments of the invention include a user-independent codebook trained on a wide variety voices. Speaker-independent codebooks of this type are well known and commonly used in general purpose speech coders. The use of such a speaker-independent codebook would alleviate the need to perform the short adaptation period as is done in the preferred embodiment, but requires more memory and would likely offer slower performance. The embodiment incorporating the speaker-independent codebook can, however, still include a virtual assistant or other approach for collecting, generating and storing user-specific keyword (e.g., command) templates.

As will be discussed in further detail below, the present invention uses an encoding strategy that minimizes the data rate, maximizes the quality of re-synthesis, and preserves perceptually relevant features for pattern matching and information recall. High data compression not only reduces storage requirements but also speeds access time to retrieve memories.

One way to describe the present invention is as a system resident in a processor-enabled mobile telephone. This embodiment of the system is a small, hand-held, battery operated device that allows wireless voice communication and also contains a CPU, computer memory, wireless I/O, a clock, GPS chip, and control buttons.

Figure 2:
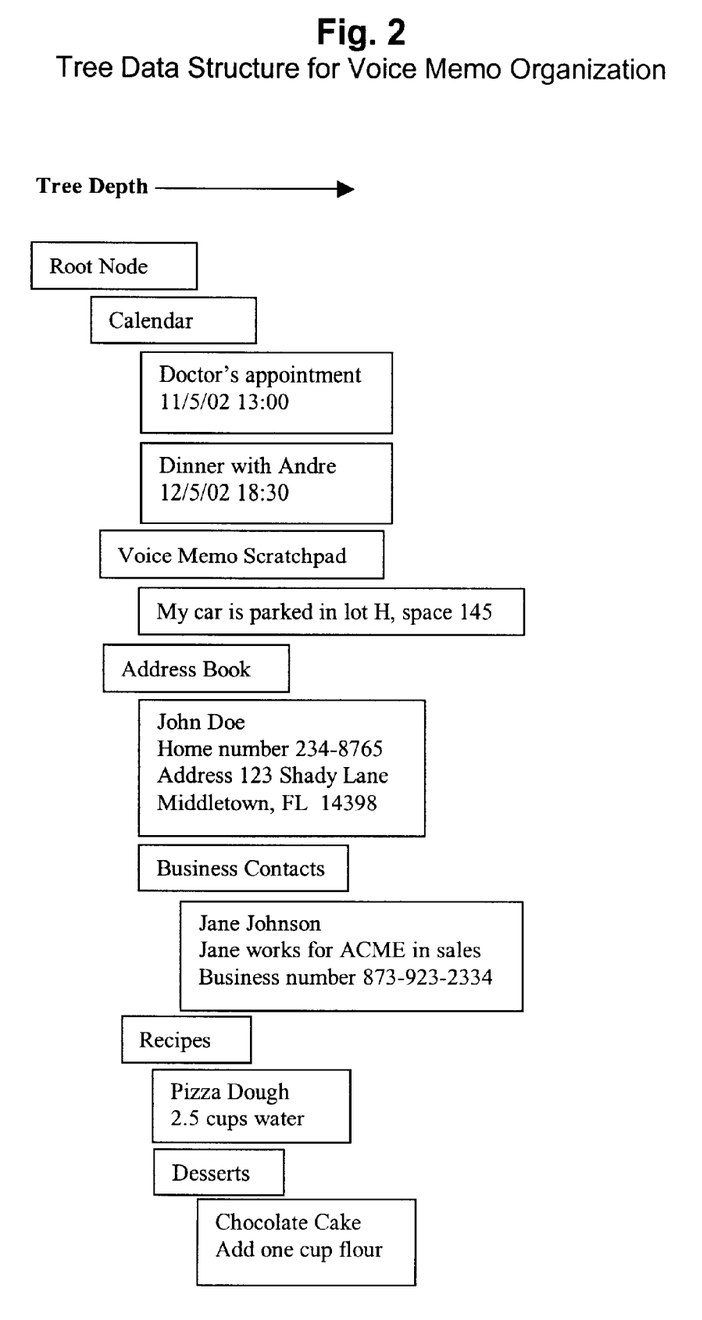
FIG. 2 is an illustration of a high level tree data structure by which information stored by the system shown in FIG. 1 can be organized.
Figure 3:
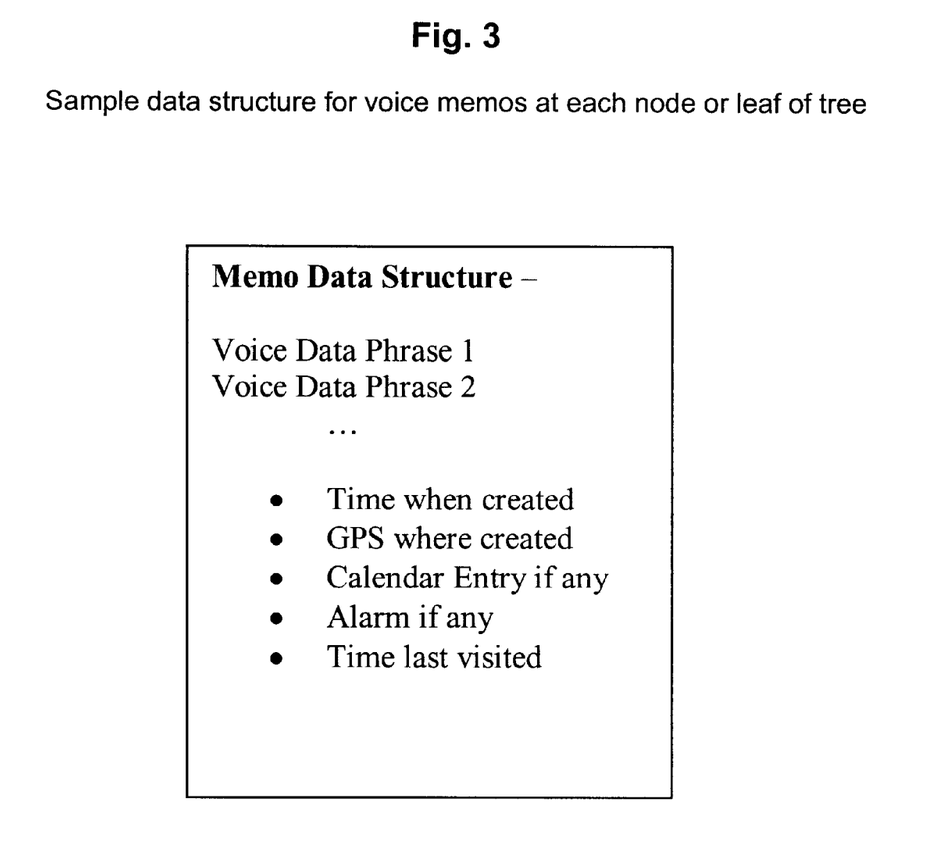
FIG. 3 is an illustration of a detailed node data structure for storing individual memos in the data structure shown in FIG. 2.

After purchasing the device, the user of the preferred embodiments of the invention will experience the following events:

1) The user selects a preferred voice assistant, for example by pressing a sequence of digits on the handset keypad. This selection specifies preferred language, personality, and gender.
2) The voice assistant operates as a user interface and is a collection of pre-recorded prompts and instructions that the PDA program plays according to user input. The initial prompt greets the user and explains that about 5 minutes of speech will be requested to adapt to the qualities of that speaker's voice and language(s). This speech may be generated by reading arbitrary text or by having a telephone conversation.
3) The voice assistant explains how to operate the present invention and through the instruction process gathers voice templates of the user speaking key words in their preferred language. Key words include commands, such as "New Memo" and key vocabulary, such as digits, months, etc.
4) At this point, the present invention is ready to use. The present invention preferably organizes voice data in a tree structure such as that shown, for example, in FIG. 2. Tree structures facilitate information categorization and retrieval. In the example tree structure shown in FIG. 2, each node is a voice memo (see FIG. 3.) that contains compressed spoken data as well as data describing time and place of creation, etc. The user creates, edits, deletes, and organizes voice memos in the tree using spoken commands. Top-level nodes are the most general categories, such as "Address Book" or "Calendar". Nodes at lower tree levels are typically subcategories of the branch topic. For example, beneath the node "Address Book" one places new nodes for each contact or contact subcategory. Naturally, these voice entries can contain any information, but typically one would store information such as the contact's name, address, and telephone number.
5) The device can be used in a hands-free mode. In this mode, the speech processing system looks (i.e., compares stored data) for keyword matches at the beginning of utterances. Some command words operate in isolation, such as 'Quit'. Others have following modifiers, such as 'Search, Address Book, Jane Doe.' If no keyword match is found, the default for long utterances is to assume the user wishes to add the utterance to the current voice memo, or create a new one depending upon the state of the system.
6) Another embodiment of the invention includes one or more control buttons that can be used to control the operation of the invention. These buttons, or combination of button positions, can for example perform functions in the following general areas:
   a. Process spoken input as a command plus modifiers
   b. Process spoken input as speech to store
   c. Control audio playback
   d. Navigate voice memos and data tree
7) Button 1, for example, can be used when speaking commands plus potential modifiers. For example, the user could press button 1 and say, "New Memo, This is an example memo". Button 1 alerts the system to match a key word at the beginning of the utterance and treat the remainder of the utterance accordingly. In this case, "New Memo" is recognized and the rest of the utterance is stored as a new memo at the current level within the data tree. Another example is, "Set Alarm, Monday zero six zero zero". In this case, matching Set Alarm alerts the system that date and time key words are to follow. An alarm is assigned to the current memo to trigger on Monday at 6 a.m. To keep performance robust and the number of key words to a minimum, entries can follow consistent grammars and numbers are preferably expressed as digits, i.e. "Two Three" vs. "Twenty-three."
8) Button (or button position) 2 can, for example, be used when adding spoken information to a memo. This second position allows one to conveniently grow a memo, such as a recipe or letter dictation, without keyword commands. It also prevents potential confusion that may arise if an uttered phrase happens to begin with a command word.
9) Other buttons or button positions can be used to control playback functions, such as play, pause, next phrase, previous phrase, beginning phrase, and last phrase, or data tree navigation functions, such as up level, down level, top level, next memo, and previous memo.
10) Information can be retrieved using voice commands such as "Search". Techniques can be used to ensure accurate retrieval. For example, if the user has no idea where in the tree structure a particular memo is stored, they may search the entire tree with a command, such as "Search, Columbus". This may return an entry from the "Address Book" branch if someone lives in Columbus, Ohio, or may return an entry from "History" if the user stored information about Christopher Columbus. If multiple entries are returned, the user may step through them until the desired entry is heard. To avoid getting multiple matches, the user may wish to narrow his search. There are multiple methods to refine a search. Some examples includes:
   a. More modifiers: "Search, Columbus, Ohio" or "Search, History, Columbus". Short pauses separate each modifier. The retrieved memo is the branch that best matches the combination of search items.
   b. Data tree and command word constraints: The "Search" command only searches data at the current branch and below, so the user could navigate to "Address Book" before invoking the "Search, Columbus" request. "Find" restricts searches to the first phrase of voice memos. "Locate" restricts searches to the current memo. "Go To" recursively prunes the search branch as each modifier is matched. "Go To" returns data more quickly than "Search" because less and less of the tree is searched as each modifier is matched.
   c. Time focus: In embodiments of the invention configured for operation with temporal commands, the user may narrow the search to memos that were created proximally to an estimated time. For example, the user can say "Focus Time, Yesterday", "Search, Meeting with Jim", to find notes about a meeting with Jim that happened yesterday vs. one that may have occurred last week.
   d. Place (i.e., geographic) focus: In embodiments configured for operation with a GPS, entries can have a GPS place stamp in addition or as an alternative to a time stamp. The user may narrow the search to memos that were created proximally to a particular place. For example, the user might say "Focus Place, Princeton University", "Search, Maxwell's Equations" if he wanted to find notes about equations studied during university Physics. The user adds names to the place dictionary by visiting them and saying "Mark Location, Princeton University, Radius, five kilometers". In this case, the present invention would assign its current GPS reading to the voice template "Princeton University", add it to the place dictionary, and assign a 5 km radius as a size estimate.

11) As voice memos are created, they may be edited and reorganized. The present invention operates more like a voice word processor than a simple voice recorder. For example, imagine the user has a memo with the following utterance, "My favorite color is blue". Speaking "Locate, blue" directs the device to find the part of the utterance that contains the sound "blue". Next, the user can say, "Replace, red". The modified utterance will resynthesize as "My favorite color is red." Alternatively, the user could say "Insert before, sky". In this case, the phrase becomes "My favorite color is sky blue". Any word (sound) sequence may be selected and deleted. Entire phrases, memos, and/or data tree branches may be deleted, copied, or moved to another part of the tree. For example, if the user needs to quickly create a memo with a name and phone number, that memo is created in whatever part of the data tree that is currently pointed to. The system defaults to a branch called "Voice memo scratchpad" if the state of the system is undetermined. Later, the user can recall the memo and place it into a more appropriate branch by saying, for instance, "Move To, Address Book".

12) To help free memory, in the preferred embodiment, every memo is given a life span. Accessing an item automatically extends its life because it tells the assistant that the user knows the memory is there and still finds it useful. Periodically, the assistant asks the user for an appropriate moment to "review" items that are about to expire. For each item, the user can then extend its lifetime or let it be recycled. This method has two desired effects. It keeps expired items from cluttering the system and also ensures that every item is periodically reviewed. This reduces the chance that stored items permanently disappear into forgotten locations. Reviewing an address entry that is about to expire can have beneficial effects, such as reminding the user that it is past due to say hello to a friend or relative.

13) The above steps describe the fundamental operation of one preferred embodiment the present invention. They describe how a substantially unlimited vocabulary, voice-operated PDA may be created and operated in a largely language independent fashion. The only language input required in the embodiment having an assistant programmed with prompts or instructions in multiple languages is to specify the language of the recorded voice assistant. The present invention solves many currently unsolved barriers to having a voice PDA. These are:
   a. Speech-to-text systems require too much memory and computation. The present invention can run on hardware available today, e.g. an Intel StrongArm SA 1100 with 8 Mbytes of RAM.
   b. Speech-to-text systems are not readily available for the majority of languages spoken throughout the world.
   c. Speech-to-text systems have limited vocabulary and make mistakes so that users cannot confidently use them.
   d. Speech-to-text systems do not adapt as readily to unique pronunciations, accents, dialects, cadence, and even unusual speech characteristics, such as lisps.

A fundamental capability of the present invention is to save spoken information in a compressed (and preferably highly compressed) format and to allow direct retrieval of that information based on speech pattern matching. Retrieved information is uncompressed and resynthesized to the user. Because data input and output can be purely voice or other sounds such as alarms, preferred embodiments of the device do not require a display screen (although one can be included as an option). This feature makes it possible to embody the present invention in a portable device much smaller than screen-based PDAs. Other advantages are that data may be entered or retrieved while performing other tasks, such as driving, and that data may be entered much more quickly and reliably than spelling with a stylus.

The language-independent, speaker-dependent approach to speech processing that drives the present invention can enable numerous other applications beyond information storage and retrieval. One preferred embodiment of the present invention includes, but is not limited to, the following applications. For each application, the voice assistant gathers requisite voice command and key word templates during programmed tutorials.

EXAMPLE APPLICATIONS

1) Time, Date, Stopwatch, and Timer Functions

Speaking the command "Date" causes the speech assistant to query the system clock, concatenate a response from its recorded vocabulary, and speak the current time and date. For example, 11:15 AM, Monday, May $27^{th}$ can be synthesized as, "one one one five Monday two seven May". Speaking "Stopwatch" causes the system to enter a stopwatch mode. The command "Start" starts the stopwatch, "Stop" stops the stopwatch, "Time" gives the current reading, "Reset" resets the stopwatch to zero, and "Return" exits the stopwatch mode.

Timers can be created simply by creating a new memo and adding an alarm. For example, speaking "New Memo, Cookies in the oven are finished" creates a new memo. Next, speaking "Set Alarm, two zero minutes" assigns an alarm to the memo that will sound in twenty minutes.

2) Temporal and Geographic Alarms

As described above, temporal alarms may be assigned to any memo. When an alarm is triggered, the present invention vibrates, produces a sound or otherwise provides an indication that alerts the user to listen to the memo content associated with the alarm.

Alternatively, the user may wish to be reminded according to a geographic event. In this case, an alarm is set to trigger the next time the user returns to a particular place. For example, if the user needs a hammer but does not want to make a special trip to the hardware store right away, the user could create a memo reminder to trigger the next time the present invention senses (via the connection to the GPS system) it is near the specified store. For example, the user would say, "New Memo, Reminder to buy a hammer", "Set Place Alarm, Home Depot".

Geographic Alarms can be most effectively implemented after the user has built a library of place names as sites are visited. For example, if the user is at the Home Depot hardware store, he could add that location to the system library by saying, "Mark Location, Home Depot, Radius point five kilometers". Radius specifications tell the present invention how general a place name is. The place name "Utah" should have a much larger radius than the place name "My house". Place alarms can also have an optional radius modifier to specify how close the device needs to be to the target location before triggering.

3) Calendar Management

Any memo may be added to the present invention's calendar database in much the same way a user adds an alarm to a memo. For example, the user could create a new memo, "New Memo, My Doctor's appointment is Monday at 11:00", then speak "Place In Calendar, one one zero zero Monday." When listening to key word input that must be recognized, the speech assistant can repeat what was understood. In this case, the speech assistant repeats "One one zero zero Monday" to confirm that the correct action was taken. Once a voice memo has been added to the Calendar, a reminder alarm may also be added. The user could ask to be reminded one hour before the appointment by speaking, "Set Alarm, one hour". For calendar entries, setting an alarm in relative terms can default to one hour before the entry, whereas saying "Set Alarm one hour" to a memo not in the calendar sets the alarm for one hour from that moment, e.g. the timer example.

Speaking "List Appointments Monday through Wednesday" directs the voice assistant to resynthesize calendar entries found within the specified delimiters. Calendar planning is traditionally accomplished using visual layouts. The present invention utilizes commands that help scheduling. For example, speaking "Recommend Time, Monday one two zero zero" causes the voice assistant to recommend an open time slot nearest noon on Monday.

4) Voice Calculator

The present invention can have a voice operated calculator. Users can use such a tool to make calculations by speaking, for example, "Calculate, Two plus Two equals." Concatenating the full calculation to the keyword "Calculate" causes the voice assistant to make the calculation and speak the response "Four". Omitting the keyword "equals" from a calculate command can put the system into a calculator mode. In calculator mode, longer calculations are easier to make. For example, the user could speak "Five minus two", "plus four Multiply three equals". In this case, the voice assistant synthesizes the calculation for confirmation then the answer. Voice calculators are available in both standard notation and Reverse Polish Notation (RPN). Though not as familiar to most people, RPN is superior for calculations beyond simple arithmetic. Example RPN syntax is "Five enter three plus result".

5) Voice Maps

Preferred embodiments of the system can be configured to automatically add GPS markers to any voice entry. For instance, if the user parks their car in a confusing parking lot, they could simply speak, "New Memo, My car is located in section G, spot 156." Then, to find the car again, the user has both a descriptive reminder and a GPS coordinate for guidance. The command "Navigate", prompts the Voice Assistant to synthesize the destination GPS coordinate relative to the user's current heading and position, e.g. "one o'clock, 500 meters."

A voice map is created by serially adding phrases to a memo as the user travels or assigns new locations to previously stored phrases. For example, imagine the user has received directions to a business. During the first trip, the user would play the directions one at a time and mark the location of the replay as they traveled. For example, play "Take Exit 15", speak "Mark Location" as you approach the exit, next play "Take right at $2^{nd}$ stop light" speak "Mark Location", etc. Now, the directions have location markers that can automatically be triggered. The next time the user makes this trip or reverse the trip, each directive can be automatically triggered as their GPS locations are approached.

6) Mobile Telephone Tasks

Speaking "Voice Dial, one two three five five eight nine" directs the voice assistant to dial the spoken telephone numbers. The present invention could dial the mobile telephone in which it was embedded or could produce tones or other signals to dial external telephones.

Also, the present invention can use pattern matching to detect numbers within an existing phrase of a voice memo. For example, an "Address Book" entry for "John Doe" could contain the phrase "Business number five two four six six nine seven." To call John at his business number, the user could speak "Go To, Address Book, John Doe, Business Number". The user knows he has reached the correct data when the voice assistant resynthesizes the matching phrases as they occur. In this case, the stored data "John Doe", then "Business Number . . . " are resynthesized. The user can interrupt and speak "Auto Dial" causing the voice assistant to search for a digit string within the current phrase, match that string to stored templates, and automatically dial the recognized digit string. This function is similar to auto dial functions currently available but is distinguished in several important ways.

- The user speaks the telephone number as part of a larger descriptive entry rather than creating a single short phrase then pressing a keypad to assign numbers.
- The searching mechanisms and organization of the data tree make the system much more powerful. Current auto dial systems are based on matching short templates assigned to frequently called numbers, such as "Mom and Dad". The present invention is designed to manage information to all contacts, even rarely called contacts. For example, imagine the user would like to call someone named John, but there are many John's in his address book. Perhaps the user remembers that this John lives in Alabama but can't remember his last name. The user can still get direct access to the contact using a compound search from the Address Book node, such as "Search, John, Alabama, home number". This search will find the entry that best matches the search parameters. Once the desired home number phrase is reached, the user could invoke the "Auto Dial" command.

If desired, the present invention could also command other functions associated with a mobile telephone, such as voice messaging services or turning the ringer off.

7) Audio Content Management

Having a central processing unit (CPU), memory storage, data I/O, and audio capabilities, the present invention can store and play on command audio content, such as MP3 encoded music, news programs, recorded books, etc.

The previous section described a number of functions that can be incorporated into the present invention. This section describes the implementation of the speech processing that drives this voice operated, language independent PDA invention. A variety of techniques are possible. The most effective will generally feature these characteristics:

- The processing should compress speech to low data rates.
- The compressed data should be effective for speech pattern matching.
- The resynthesized speech should be comprehensible and pleasing to hear.
- The processing should adapt to a user's speech and language quickly.
- The processing should be computationally efficient to run on portable devices with modest memory and computing power.

Figure 4:
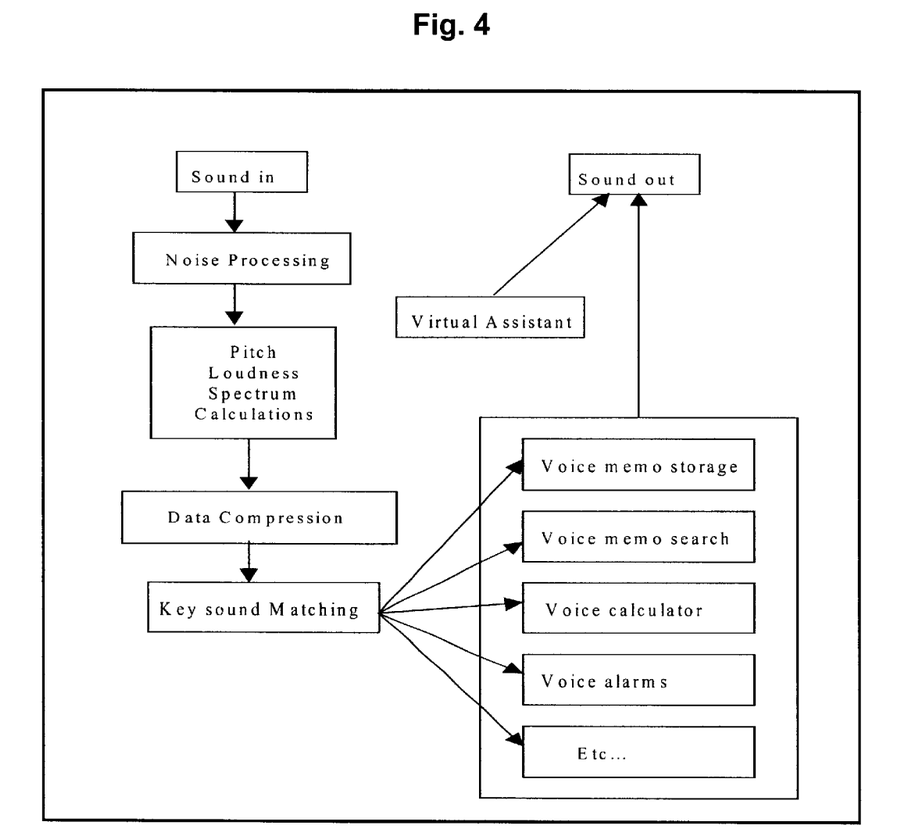
FIG. 4 is a flowchart illustrating the operation of one embodiment of the system shown in FIG. 1.

FIG. 4 is a flow chart depicting the process utilized by one preferred embodiment of the present invention.

1) Sound In

A subroutine buffers digitized voice data from a microphone. The incoming data can, for example, be sampled at 12 kHz and collected into frames with 384 samples. The data can also be reframed every 192 samples.

2) Noise Processing

A spectral representation of each frame is calculated. As an example, one approach for this calculation follows: first, the frame is zero padded up to N=512 samples; second, a Hamming window is applied;

$$w_n = \begin{cases} 0.54 - 0.46\cos\left(\dfrac{2\pi n}{N-1}\right) & 0 \le n < N \\ 0 & \text{otherwise} \end{cases}$$

third, an amplitude spectrum is calculated using the absolute value of the discrete Fourier transform;

$$|X_k| = \left|\sum_{n=-\infty}^{n=\infty} w_n x_n e^{-i\frac{2\pi nk}{N}}\right| \quad \theta_k = \frac{2\pi k}{N} \quad 0 \le k \le N$$

Total frame energy is calculated by summing the power spectrum across all frequencies k $$\text{Energy} = \sum_k S_k = \sum_k |X_k|^2$$

Speech activity is detected when frame energies exceed twice that found in periods of silence. During periods when no speech activity is detected, the spectral estimate of background noise can be continuously updated.

$$|X|_{noise}(t_n) = \begin{cases} |X|_{noise}(t_{n-1}) + \\ 0.2(|X|_{noise}(t_n) - |X|_{noise}(t_{n-1})) & \text{when no speech is detected} \\ |X|_{noise}(t_{n-1}) & \text{otherwise} \end{cases}$$

For each frame, the noise spectral amplitude estimate is subtracted from the total spectral amplitude estimate. This noise-reduced spectral amplitude estimate is then transformed back into the time domain using an inverse short-term discrete Fourier transform with phase information from the original signal.

$$|X|_{new} = |X|_{original} - |X|_{noise}$$

$$s_n = x_{new} = \frac{1}{N} \sum |X_k|_{new} e^{i\phi_{original}} e^{i\frac{2\pi nk}{N}}$$

$s_n$ is now a representation of the original signal with spectral energy attenuated according to background noise estimates.

3) Feature Extraction

Preferred embodiment of the invention operate by estimating three features from the digitized speech signal, $s_n$: first, voicing and pitch are estimated from $s_n$ with an autocorrelation operation;

$$r_k = \sum_{n=0}^{N-1-k} s_n s_{n+k}$$

The maximum peak in the autocorrelation function $r_k$ determines the pitch period for a voiced frame. A threshold equal to 0.1 the maximum detected value is used to determine if a frame is voiced or unvoiced in one embodiment.

Second, the spectrum of each frame is estimated. In the preferred embodiment, this estimation is made using warped linear prediction analysis as described in Laine U.K., Karjalainen M., and Altosarr T., "Warped Linear Prediction (WLP) in Speech and Audio Processing," Proc. IEEE ICASSP—94, Adelaide, Australia, 1994. WLP is similar to standard linear prediction, except that allpass fractional delay sections are used instead of standard unit delays, $z^{-1}$.

$$\tilde{z}^{-1} = \frac{z^{-1} - \lambda}{1 - \lambda z}$$

The 1994 paper describes how to calculate WLP coefficients $a_i$. In the present invention, they are calculated to order p=12 with $\lambda$=0.4. Loudness or 'gain' G for each frame is estimated from the prediction and autocorrelation coefficients.

$$G^2 = 1 - \frac{1}{r_0} \sum_{k=1}^{p} a_k r_k$$

4) Compression

The estimates for pitch, loudness, and the spectrum are compressed using scalar and vector quantization respectively. In one embodiment, pitch is quantized using 6 bits representing 128 evenly distributed bins between 60 and 300 Hz. Loudness is quantized in this embodiment using 5 bits representing 32 evenly distributed bins between zero and the maximum output determined by sound hardware.

In one embodiment of the invention, the WLP vector quantizer has 512 vectors trained on 5 minutes of unspecified speech from the user. The codebook used by the system adapts to the user's voice using a K-means method combined with the Itakura distance metric (described below) in this embodiment.

5) Key Sound Matching

Key sounds for commanding and controlling the present invention are detected by comparing user input to user-registered sounds. Template matching of the WLP coefficients is implemented with dynamic time warping and the Itakura distant metric d.

$$d(x, y) = \log\left(\frac{E_x}{E_y}\right) = \log\left(\frac{xRx^T}{yRy^T}\right)$$

where x is a vector of template WLP coefficients, $$x = [-1 a_1 a_2 \ldots a_p]$$

y is a vector of observed WLP coefficients, $$y = [-1 a_1' a_2' \ldots a_p']$$

and R is a matrix of autocorrelation coefficients.

$$R = \begin{bmatrix} r_0 & r_1 & r_2 & \cdots & r_p \\ r_1 & r_0 & r_1 & \cdots & r_{p-1} \\ r_2 & r_1 & r_0 & \cdots & r_{p-2} \\ \cdots & \cdots & \cdots & \cdots & \cdots \\ r_p & r_{p-1} & r_{p-2} & \cdots & r_0 \end{bmatrix}$$

For each input utterance, the speech signal is analyzed and WLP vectors from each frame are collected into a matrix. Dynamic time warping is used to compare the input WLP matrix to previously stored template matrices. First, a distance matrix is constructed by calculating the distance metric $D_{ij}$ for each input vector with every template vector.

$$D_{ij} = \text{input frames} \begin{bmatrix} D_{11} & \cdots & \cdots & \cdots & D_{1n} \\ \cdots & \cdots & \cdots & \cdots & \cdots \\ D_{ml} & \cdots & \cdots & \cdots & D_{mn} \end{bmatrix} \text{template frames}$$

Standard dynamic time warping can be used to calculate the optimal path through the distance matrix. The total matching score is equal to the sum of the individual distances $D_{ij}$ along the path divided by the path length.

An adaptable threshold is preferably used to determine whether an input utterance matches a command template.

6) Retrieval Enhancement Using Parallel Phoneme Estimation Track

It is well known that coarticulation and varying speaking rates can make it difficult for dynamic time warping to successfully match two speech patterns. Phoneme estimation is one technique that can be used to improve robustness. In this approach, a phoneme estimator based on hidden markov models or neural networks records a parallel phoneme estimation track along with the compressed speech features. During pattern matching and retrieval, the DTW and phoneme estimation scores jointly determine which patterns match best. Reasons for not incorporating these features into the invention system:

Phonemes are language dependent. Using speaker independent phoneme estimation would reduce the ease with which the present invention adapts to new language.

Phonemes estimation requires significantly more computation than the described speech feature extraction.

7) Voice Memo Searches

A significant function that the present invention enables is the ability to retrieve voice memos by speaking key sounds associated with a desired memo. Utterances embedded within memos are detected by comparing the search sound to every position in the sound database. In preferred embodiments, a distance matrix is calculated for the input template vs. the entire database. For each starting position along the distance matrix, a best path and score is calculated using dynamic time warping. The starting position with the lowest overall score determines the location of the desired memo in this embodiment. In the case of a 'search' command, the found memo is resynthesized in response to the user's query.

8) Syntax

Each application generally operates more efficiently and effectively with a certain syntax. For example, a search command is initiated by uttering the "search" key sound first, followed by other key sounds that are used to search the database. Distinct modifiers are separated by short pauses during command utterances.

9) Voice Assistant

The voice assistant interacts with the user to help the user know what state the system is in. It also speaks concatenated recorded answers to certain queries, such as the time of day or the answer to a calculation. The help level determines how much or little the virtual assistant prompts the user. A novice user may need to be reminded at each step what syntax is expected, but a more advanced user can disable the prompts for expediency.

10) Sound Out

Voice information in the database is uncompressed and resynthesized to the user upon request. Resynthesis is performed by the following steps in one embodiment of the invention: first, decode the quantized values for pitch, gain, and linear prediction coefficients; second, create a voicing signal u according to the pitch information. The voicing signal for voiced segments is formed from unit impulse functions separated by linearly interpolated pitch periods. The voicing signal for unvoiced frames are formed from Gaussian random noise. Third, convert the voicing signal to the frequency domain using a discrete Fourier transform.

$$u_n = \begin{cases} \text{impulse functions at pitch period} & \text{if voiced} \\ \text{gaussian random noise} & \text{if unvoiced} \end{cases}$$

$$U_k = DFT\{u_n\}$$

Next, calculate the LP spectrum for the frame, $$H_k = \frac{G}{DFT\{[a'_0 \cdots a'_p \quad 0_1 \cdots 0_{N-p}]\}}$$

The speech signal for the resynthesized frame $s_{syn}$ is found by applying an inverse discrete Fourier transform to the voicing spectrum U multiplied by the LP spectrum H.

$$s_{syn} = IDFT\{U_k H_k\}$$

Each frame signal $s_{syn}$ is preferably multiplied by a triangle window and then overlapped and added to adjacent frames in order to reproduce a smooth synthesized speech signal.

The present invention provides a voice operated digital assistant specifically designed to help its user manage memory, time, locations, and/or calculations. The present invention stores the input data as compressed sound, and replays the output data as sound, so there is no need to convert to text and back. This reduces the computation and memory requirements by capitalizing on the user's ability to process speech. Furthermore, as there is no need to display text on a screen, significantly smaller devices (such as a wristwatch) can implement the present invention.

Because the present invention stores speech, as sound, it is more reliable than speech-to-text, text-to-speech systems. For example, if a person misspeaks while using a conventional speech recognition system, most likely, the speech recognizer will generate nonsense. If, however, a person misspeaks into the present invention, the present invention will simply resynthesize the message at retrieval time and allow the user to decipher it. An analogy is the ability to read your own handwriting even though others (especially computers) may have difficulty.

The present invention offers important advantages over traditional speech technology. For example, because the present invention is intended to be used by a single user, it is more reliable due to the fact that there is much less pronunciation variation from an individual speaker than across multiple speakers.

In addition, the present invention achieves higher compression rates because it only needs to encode speech from a single speaker. General-purpose codecs must encode speech from arbitrary speakers.

During sound capture, the present invention calculates and records both prosody (intensity, pitch, duration) and acoustic information relevant for speech recognition (spectral patterns). Capturing both of these streams simultaneously allows the present invention to re-synthesize speech almost identical to that recorded, thus providing a higher quality and more comprehensible synthesis than traditional text-to-speech systems can provide.

The speaker-dependent nature of the present invention also provides a degree of user security. Built-in voice identification and voice passwords keep others from accessing the user's data. The system passively monitors voice features during use. If voice quality suddenly differs from expected models, the system can effectively become suspicious and prompt for a password. This two-stage system keeps the user from having to constantly use passwords but also allows the user some voice changes, due to head colds or varying emotional states, without shutting the user out.

The present invention also allows the user to access and store information faster than competing technologies. This speed allows users to store, organize and retrieve information at the speed of speaking, without co-opting the user's eyes or hands.

The present invention allows the construction of a largely language independent device. Only the instructions need to be translated to the end user's preferred language. After that, the system automatically adapts to the user's voice, and the user may store information about subject without fear that his words may be out-of-vocabulary.

The user interface of the present invention provides a built-in voice personality that provides information feedback, assistance, and user training. The personality consists of pre-recorded, compressed prompts read by an actor. The interface delivers the prompts at appropriate moments according to the needs of the user.

The present invention allows all command and control of device functions to be achieved through one or more buttons and/or user-registered sounds. The voice assistant governs template creation during user training.

Because the present invention uses sound templates, it adapts substantially to the user's language, dialect, pronunciations, etc. Changing the system from English to Icelandic simply involves loading a new voice assistant that has been translated and recorded in Icelandic.

While most user-supplied information is stored as compressed speech, some sounds, such as digits and days of the week, are matched with user templates in order to associate with the sound patterns symbols that are meaningful to the computer.

The search algorithm allows direct access and editing of thoughts and information without having to remember where the data was stored.

Because the information is stored as sounds (and is not converted to text), the user may use substantially unlimited vocabulary or even mix languages, limited only by available memory.

Those skilled in the art will recognize that the present invention stores the compressed speech data so that it is optimized both for synthesis and recognition. Re-synthesizing this compressed sound data is more intelligible and natural sounding than can be achieve by text-to-speech systems.

The compression algorithms used by the present invention can achieve higher levels of speech compression than existing codecs. This not only allows more speech data to be stored but also speeds retrieval performance since less data needs to processed in order to discover a matching utterance.

Because of the novel speech processing technique, the present invention allows the user to take memos on any subject and store them in a way that allows intuitive and direct access to the information over long periods of time. The invention is more portable and can be used in the field more effectively than stylus-based PDAs. This allows, for example:

A policeman to conveniently create memos describing accident scenes, fleeing suspects, or license plate numbers.

A student to create voice 'flash cards' of concepts and definitions while studying. Such notes would not only be a useful study mechanism, but also allow the student to retrieve long-forgotten information years later.

A sports journalist to take notes on a game without missing any action.

A cattleman to keep track of animal numbers and weights.

An engineer to do complex calculations in the field.

In summary, the present invention provides a voice-interactive, personal information assistant and associated method. The invention has been designed to excel in these areas:

Language independence.

Speaker adaptation.

Moderate computational and memory demands.

Speed and reliability of information entry and recall.

Portability.

Ease of use.

Richness of functionality.

The voice-operated interface of the present invention offers several significant improvements. First, information is entered at the speed of speaking. Dictating an event description, an address, a grocery list, the dimensions of a building site, the test results of a patient, etc. can be performed up to 10 times faster than spelling them on a pen-based PDA.

Second, information may be entered with minimal hand or eye distraction. The present invention may be used while driving, reporting on live events, walking through a grocery store, or taking inventory notes while stocking shelves.

Third, the present invention may be integrated into a small, wearable device. With continued electronics miniaturization, the present invention may be fully implemented as a wristwatch, or worn anywhere and interacted with through a remote earpiece. The present invention may be integrated into a portable telephone or other portable device without significantly adding to the size of the device.

The present invention improves PDA convenience through a novel voice interface that allows the user to store, edit, and organize spoken information and also facilitates direct random access to these stored memories. The memories can be information, ideas, numbers, reminders, melodies—anything that a voice can express. The intuitive user interface, based on speaking and synthesized response, allows the user to take advantage of personal information management better than currently available PDAs.

In addition to its primary function of storing and retrieving voice information, the present invention allows users to perform a wide variety of tasks including, voice numeric calculations, voice timer functions, voice auto dialing, voice alarms set to trigger on time or location events, voice GPS navigation and labeling of geographic locations, and voice management of audio content.

Although the present invention has been described with reference to preferred embodiments, those skilled in the art will recognized that changes can be made in form and detail without departing from the spirit and scope of the invention. In particular, in addition to those described above, other combinations of applications can be incorporated into system. A wide variety of currently available or otherwise known hardware systems and processing algorithms can also be used to implement the described and claimed functionality.

What is claimed is:

1. A voice operated portable information management system that is substantially language independent and capable of supporting a substantially unlimited vocabulary, including:
    an input transducer for receiving a user's speech;
    an output transducer for outputting sound including speech;
    a speech processing system coupled to the input and output transducers and including means for:
        generating and storing compressed speech data corresponding to a user's speech received through the input transducer;
        comparing the stored speech data;
        re-synthesizing the stored speech data for output as speech through the output transducer;
        providing an audible user interface including a speech assistant for providing instructions in the user's language;
        storing user-specific compressed speech data, including commands, received in response to prompts from the speech assistant for purposes of adapting the system to the user's speech;
        identifying memo management commands spoken by the user, and storing and organizing compressed speech data as a function of the identified commands;
        identifying memo retrieval commands and search utterances spoken by the user, performing a best-match search comparing the search utterances to all or specified parts of the stored speech data, building a most likely candidate list of stored speech data, and outputting the identified stored speech data as a function of the commands; and
        identifying memo edit commands spoken by the user, and editing the identified stored speech data as a function of the commands.

2. The information management system of claim 1 wherein:
    the system further includes one or more switches actuated by a user to indicate memo management commands and/or memo retrieval commands; and
    the speech processing system is coupled to the one or more switches and operates as a function of the actuated switches.

3. The information management system of claim 1 wherein:
    the system further includes a clock; and
    the speech processing system is coupled to the clock and includes means for:
        identifying temporal commands spoken by the user, and storing and organizing compressed speech data and temporal actions, including alarms, as a function of the commands; and
        responding to the stored temporal actions.

4. The information management system of claim 3 wherein:
    storing temporal actions includes storing time stamps; and
    responding to temporal actions includes responding as a function of the stored time stamps.

5. The information management system of claim 1 wherein:
    the system further includes a global positioning sensor (GPS); and
    the speech processing system is coupled to the GPS and includes means for:
        identifying geographic commands spoken by the user, and storing and organizing compressed speech data and geographic actions, including alarms, as a function of the commands; and
        responding to the stored geographic actions.

6. The information management system of claim 1 wherein:
    storing geographic actions includes storing geographic stamps; and
    responding to geographic actions includes responding as a function of the stored geographic stamps.

7. The information management system of claim 1 and further including a data port coupled to the speech processing system for communicating data and programs.

8. The information management system of claim 1 wherein the speech processing system further includes means for:
    identifying calculation commands spoken by a user, and storing compressed speech data and performing calculations as a function of the data and commands; and
    outputting results of the performed calculations in speech.

9. The information management system of claim 1 wherein the speech processing system further includes means for:
    identifying calendar management commands spoken my a user, and storing and organizing compressed speech data as a function of the commands; and
    identifying calendar retrieval commands spoken by a user, and retrieving and outputting stored speech as a function of the commands.

10. The information management system of claim 1 wherein the speech processing system further includes means for:
    identifying telephone management commands spoken by a user, and storing and organizing compressed speech data as a function of the commands; and
    identifying telephone retrieval commands spoken by a user, and retrieving and outputting stored speech as a function of the commands.

11. The information management system of claim 1 wherein the speech processor includes:
    means for dividing speech into a plurality of frames;
    means for extracting features from the frames of speech; and means for compressing the extracted features.

12. The information management system of claim 11 wherein the means for extracting features includes means for calculating pitch, spectral envelope and gain.

13. The information management system of claim 12 wherein the means for calculating the spectral envelope includes means for calculating the spectral envelope using a warped linear prediction operation.

14. The information management system of claim 11 wherein the means for compressing the extracted features includes means for compressing pitch and gain using scalar quantization.

15. The information management system of claim 11 wherein the means for compressing the extracted features includes means for compressing the spectral envelope as a function of the user-specific compressed speech data stored during operation in the codebook generation mode.

16. The information management system of claim 1 wherein the speech processing system stores the speech assistant instructions in a plurality of languages and provides the prompts in a language selected by a user.

17. The information management system of claim 1 wherein the speech data is stored in a tree structure.

18. The information management system of claim 17 wherein the speech data is stored in a tree structure determined by user-spoken commands.

19. The information management system of claim 1 wherein storing compressed speech data includes storing the time of storage and the location of the system at the time of storage.

20. The information management system of claim 1 wherein the speech processing system further includes means for:
   identifying telephone task commands, including dialing commands; and
   responding to the telephone task commands, including dialing requested telephone numbers.

21. The information management system of claim 1 wherein the speech processing system further includes means for:
   identifying audio content management commands, including store and play commands; and
   responding to identified commands, including storing and playing audio content.

22. The information management system of claim 1 wherein:
   the system further includes a global positioning sensor (GPS); and
   the speech processing system is coupled to the GPS and includes means for:
      storing location stamps associated with stored speech data;
      in response to commands and search utterances, performing best-match voice searches to identify stored location stamps;
      in response to commands and search utterances, performing best-match voice searches biased to geographic locations, to identify stored speech data having location stamps corresponding to the geographic locations;
      identifying geographic commands spoken by a user, and outputting synthesized voice responses in response to the identified geographic commands; and
      identifying geographic events as a function of the GPS and outputting synthesized voice responses and/or stored speech data in response to the identified geographic events.

23. The information management system of claim 1 wherein:
   the system further includes a clock; and
   the speech processing system is coupled to the clock and includes means for:
      storing time stamps associated with the stored speech data;
      in response to commands and search utterances, performing best-match voice searches to identify stored time stamps;
      in response to commands and search utterances, performing best-match voice searches biased to times, to identify stored speech data having time stamps corresponding to the times;
      identifying temporal commands spoken by the user and outputting synthesized voice responses in response to the identified temporal commands; and
      identifying temporal events as a function of the clock and outputting synthesized voice responses and/or stored speech data in response to the identified temporal events.

* * * * *

UNITED STATES PATENT AND TRADEMARK OFFICE
CERTIFICATE OF CORRECTION

PATENT NO.     : 6,711,543 B2
DATED          : March 23, 2004
INVENTOR(S)    : Seth A. Cameron It is certified that error appears in the above-identified patent and that said Letters Patent is hereby corrected as shown below:

Column 18,
Line 47, delete the word "my" and replace it with -- by --

Signed and Sealed this

Thirteenth Day of July, 2004

JON W. DUDAS
*Acting Director of the United States Patent and Trademark Office*